US009889546B1

(12) United States Patent
White

(10) Patent No.: US 9,889,546 B1
(45) Date of Patent: Feb. 13, 2018

(54) PIPE COUPLING IMPACT TOOL

(71) Applicant: Joel Paul White, Lexington, NC (US)

(72) Inventor: Joel Paul White, Lexington, NC (US)

( * ) Notice: Subject to any disclaimer, the term of this patent is extended or adjusted under 35 U.S.C. 154(b) by 50 days.

(21) Appl. No.: 15/150,727

(22) Filed: May 10, 2016

(51) Int. Cl.
*B23P 19/04* (2006.01)
*B25B 27/02* (2006.01)

(52) U.S. Cl.
CPC .................................... *B25B 27/02* (2013.01)

(58) Field of Classification Search
CPC ............... B23Q 3/00; B23Q 3/06; B23Q 3/18
See application file for complete search history.

(56) References Cited

U.S. PATENT DOCUMENTS 1,951,660 A * 3/1934 Klaudt ................... A47H 1/022 16/94 D
4,909,892 A 3/1990 Quinn et al.
5,006,198 A 4/1991 Pasquini
5,052,608 A * 10/1991 McClure ............ B23K 37/0533 228/44.5
5,215,288 A * 6/1993 Lyon ......................... B60P 7/15 254/113
5,226,231 A * 7/1993 De Leebeeck .......... B25B 27/10 29/237
5,769,580 A * 6/1998 Purvis ....................... B60P 7/15 410/143
5,855,720 A 1/1999 Johnson et al.
6,247,882 B1 * 6/2001 Huang ...................... B60P 7/15 410/143
6,736,371 B1 * 5/2004 Burrows ................... B60P 7/15 254/114
6,866,249 B1 * 3/2005 Campbell .............. A62B 3/005 254/104
7,311,294 B1 * 12/2007 Ruan ......................... B66F 1/06 254/100
8,202,029 B2 * 6/2012 Chou ........................ B60P 7/15 410/143

* cited by examiner

*Primary Examiner* — Lee D Wilson
(74) *Attorney, Agent, or Firm* — Suzanne Kikel, Patent Agent

(57) ABSTRACT

An impact tool couples two or more aligned pipes to form a system of aligned pipes in a safe manner. The impact tool has a strut having opposed spaced-apart ends, an impact-delivering plate mounted on the first end of the strut, and an impact-absorbing plate mounted on the second end of the strut. The plates have an outer surface with a co-extensive rubber cover. The strut has two co-extensive elongated members extending between the plates, and a shoe is mounted on the first and second ends of the strut for securing the plates to the strut. The impact tool is heavy and powerful enough to force and couple the pipes together without the need of a sledge hammer and/or additional workmen.

6 Claims, 3 Drawing Sheets

PIPE COUPLING IMPACT TOOL

BACKGROUND OF THE INVENTION

1. Field of the Invention

The present invention relates to the general art of impact tools, and more particularly, to an impact tool for delivering a force to couple two or more aligned pipes to form a system of aligned pipes.

2. Brief Description of the Prior Art

Couplings and fittings of various types are used for joining pipes and conduits. Examples include threaded fittings; couplings that are secured with solvent adhesives; weldments; and various push-type couplings. The performance criteria for pipe coupling mechanisms are generally determined by such factors as the pipe materials, design pressures, temperature ranges, fluid-tight requirements, pull-out resistance requirements, and environmental conditions.

For example, the nationwide, fiber-optic telecommunications networks consist largely of buried fiber-optic cables. The cables are commonly protected from groundwater and other subsurface conditions by enclosing them within plastic conduits. A common fiber-optic cable installation procedure involves placing the empty conduits below grade with special trenching and tunnel-boring equipment, where after the fiber-optic cables are blown through the conduits with high-pressure air. The plastic conduits and the connecting fittings used in such installations must be impervious to groundwater, resistant to the corrosive effects of soil, and capable of maintaining relatively high internal air pressures. Therefore, the connecting fittings or couplings used for joining two or more conduit sections together require sufficient pull-out resistance to withstand internal air pressures, and to resist tensile forces which tend to separate the conduit sections by pulling apart their connections.

Conduit coupling systems are commonly used in adverse field and environmental conditions where only minimal equipment is available and speed is relatively important. Therefore, machining and other preparations of the ends of the conduit sections on sight should be eliminated or minimized. Manually-operated hand tools are generally preferred due to their portability and independence from external power sources. Moreover, the couplings and other fittings should be relatively simple, inexpensive, strong, and reliable. Still further, the bores of the aligned conduit sections should be free from obstructions after the conduit sections are coupled.

When hitting PVC conduit sections together, in general, one workman has to stand and hold both conduit sections, while a second workman hits the conduit sections together. A further current practice for joining two or more conduit sections together is to first align the conduit sections in a trench. A workman then places a plank measuring approximately 2 inches by 4 inches against one end of the proximal conduit and then uses a sledge hammer to hit against the plank, which, in turn delivers enough force to the proximal conduit to join the aligned conduits together. It is apparent that the current day methods for joining two or more conduit sections together to form an aligned conduit system can be dangerous to the workmen, notwithstanding the fact that these current day practices can be tedious and time consuming.

There is therefore a need in the art for an improved method and an improved tool for use in joining two or more coupling conduit members, such as plastic conduits or pipe members, together.

There is a further need in the art to provide a pipe coupling impact tool which facilitates the safe joining of one or more conduits or pipes and their respective fittings together without the need for a workman to stand and hold both conduit sections together.

There is a further need in the art to provide an impact tool which may eliminate the need for a sledge hammer or similar device and/or to lessen the number of workmen needed in present-day practice for coupling two or more aligned pipes

SUMMARY OF THE INVENTION

The present invention has met these needs. The invention provides an impact tool for coupling a system of pipes or conduits together. The system of pipes comprises two or more pipes or conduits, such as PVC pipes or conduits. The impact tool is placed against the end of a proximal pipe or conduit, and a workman then holds this impact tool and strikes the impact tool against the end of the proximal pipe to deliver one or more forces against the end of the proximal pipe or conduit such that the conduits and their fittings are joined together. The impact tool is capable of physically driving two or more 6 inch PVC conduits together with the use of the workman's arms. That is, the impact tool of the invention is heavy and strong enough for a workman to directly use the impact tool to apply a sufficient force to the proximal pipe such that the aligned pipes are driven together and coupled. This operation can be done without the use of a sledge hammer or similar device. The impact tool has a large footprint that is used for hitting and driving the impact tool against at least one conduit which is in alignment with one or more additional conduits. Through the operation of the impact tool via a workman, the impact tool provides enough force to push small or large diameter PVC conduits together. As a result, the impact tool of the invention aids in eliminating the use of a sledge hammer and/or a wooden plank which in present day practice are necessary and which if used may injure the workmen. The impact tool of the invention allows the workman who is directly employing the impact tool to back away from the conduits or pipes once they are aligned in place thereby lessening the chances of the workman from being injured.

The impact tool of the invention is constructed to deliver one or more impacts or forces to couple two or more aligned pipes to form a system of aligned pipes. The impact tool comprises a strut having a first end and a second end; an impact-delivering plate mounted on the first end of the strut, and an impact-absorbing plate mounted on the second end of the strut. The impact tool is positioned to have the impact-delivering plate located adjacent to the end of a first pipe and the impact-absorbing plate spaced away from the end of the first pipe so that the force applied to the impact-absorbing plate is transferred through the strut to the impact-delivering plate and to the first pipe to force the aligned pipes together. Both the impact-absorbing plate and impact-delivering plate comprise a rubber cover which is co-extensive with the outer surface of each plate. The strut is comprised of two co-extensive elongated members extending between the impact-delivering plate and the impact-absorbing plate. A shoe is mounted on the first end and the second end of the strut for securing the impact-absorbing plate and impact-delivering plate to the strut.

These and other features and advantages of the present invention will be better appreciated and understood when the following description is read in light of the accompany drawings.

BRIEF DESCRIPTION OF THE DRAWING

The components in the figures are not necessarily to scale, emphasis instead being placed upon illustrating the principles of the invention. Moreover, in the figures, like referenced numerals designate corresponding parts throughout the different views.

DETAILED DESCRIPTION OF THE INVENTION

Figure 1:
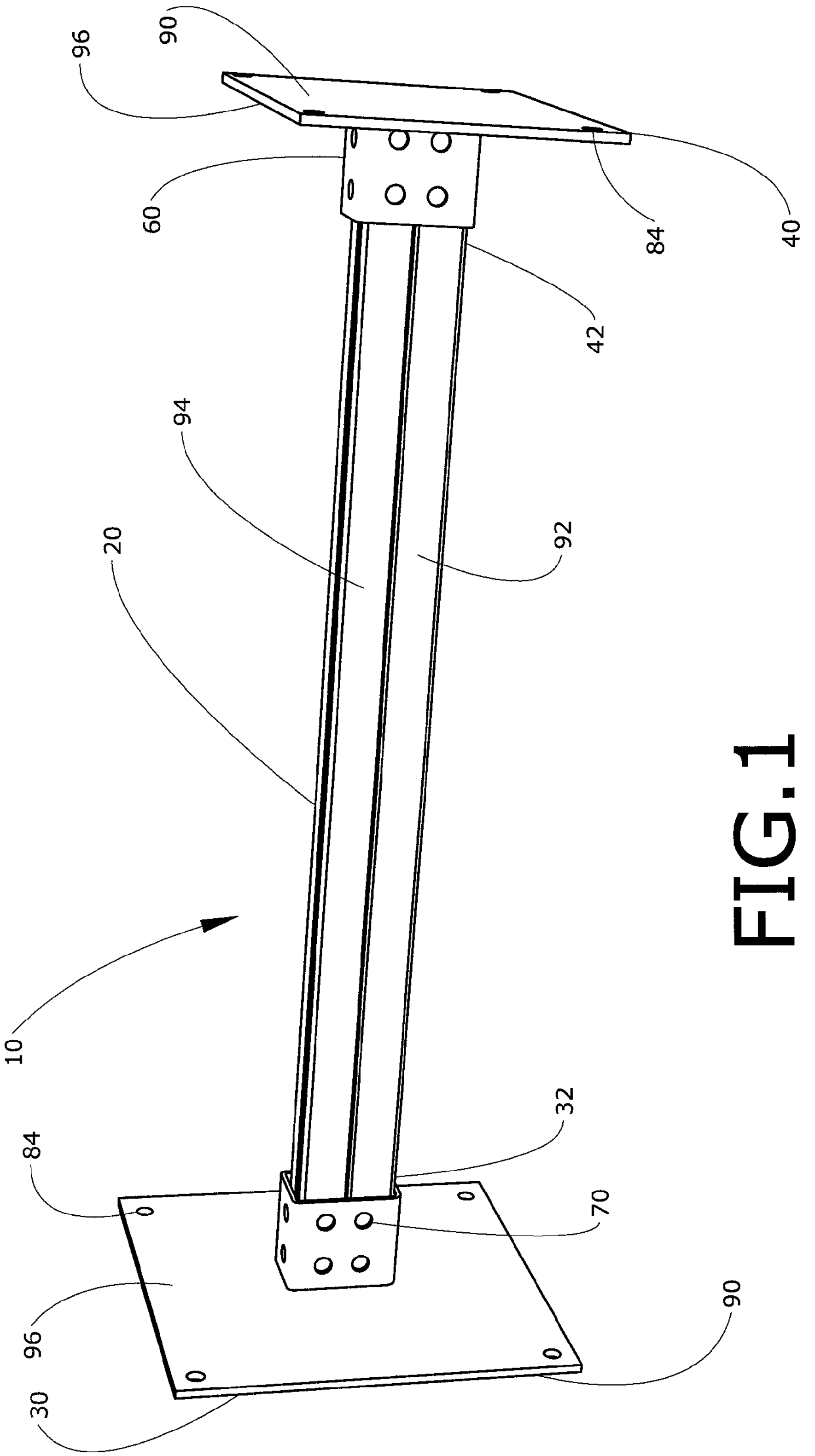
FIG. 1 is a perspective view of an impact tool of the present invention.

Referring to FIG. 1, an impact tool 10 comprises a strut 20 that has a first end plate 30 on first end 32 of strut 20 and a second end plate 40 on the second end 42 of strut 20, which is opposite to first end 32 of strut 20. In general, first end plate 30 is the impact-absorbing plate and second end plate 40 is the impact-delivering plate, more of which is explained herein below. The end plates 30, 40 are affixed to strut 20 by a shoe 60 that is unitary with end plate 30, 40 and which shoe 60 is attached to strut 20 by a plurality of bolts, one of which is indicated at numeral 70.

Figure 2:
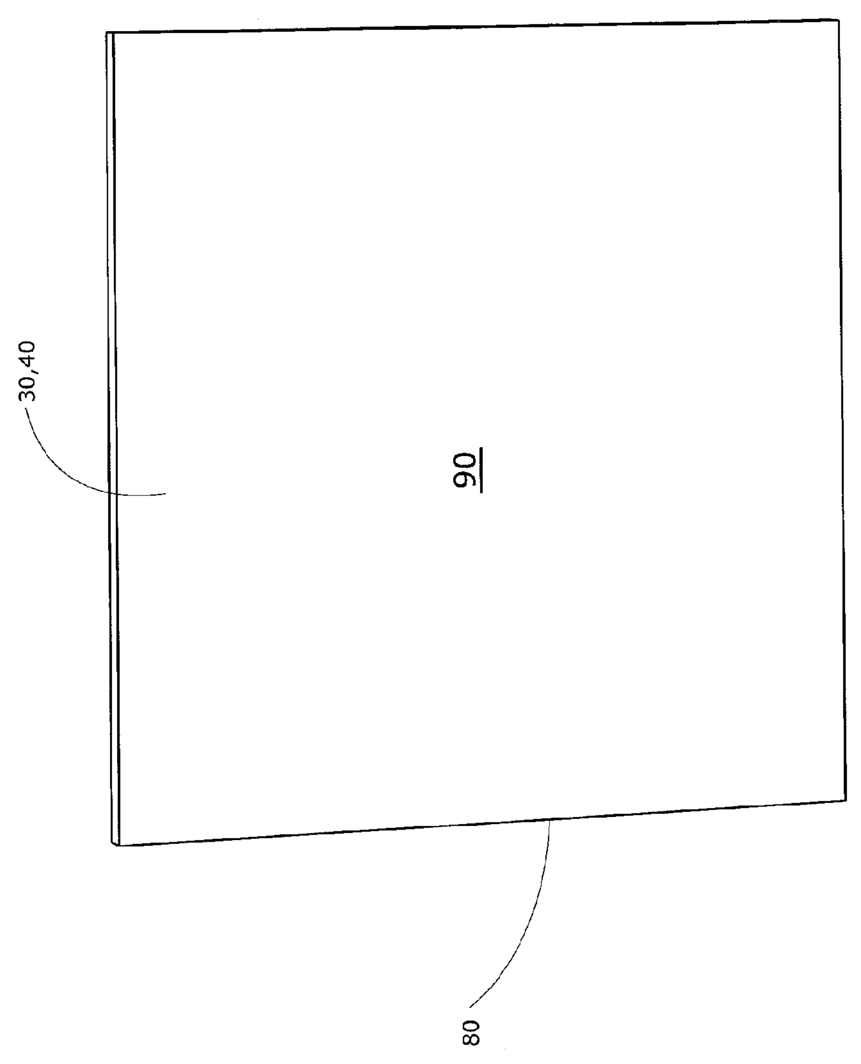
FIG. 2 is an end view of the impact tool of FIG. 2.

As shown in FIG. 2, a flat rubber cover 80 is overlaid and secured through suitable means, such as, for example, bolts on an outer surface 90 of each end plate 30, 40. In an embodiment of the invention, the flat rubber cover 80 is about one-half inch thick and is attached to the outer surface 90 of each end plate 30, 40 via bolts located at each corner of end plate 30, 40, two of which are indicated by numeral 84 in FIG. 1. In an embodiment of the invention, flat rubber cover 80 extends co-extensively with outer surface 90 of end plate 30, 40.

Referring again to FIG. 1, strut 20 is comprised of two co-extensive elongated members 92 and 94, the ends of which extend into shoe 60. Each co-extensive elongated member 92 and 94 is made of a hollow extruded metal having a cross-sectional rectangular shape and a wall thickness of about ⅛ inch. As will be understood, end plate 40 serves as an impact-delivering plate in that it delivers an impact to the end of a first pipe, and end plate 30 acts as an impact-absorbing plate in that it absorbs an impact and distributes this force or impact through strut 20 and into end plate 40 when impact tool 10 is used to cause two or more aligned pipes to be joined together to form a system of coupled pipes. It is to be appreciated that impact tool 10 is heavy enough to join the pipes together without the need of a sledge hammer or similar device.

Still referring to FIG. 1, each shoe 60 is affixed through suitable means, such as, for example, welding to an inner surface 96 of end plates 30, 40.

In an embodiment of the invention, end plate 30 may measure approximately 12 inches wide and 12 inches long, and end plate 40 may measure approximately 8 inches wide by 8 inches long. These plates 30, 40 may be different sizes due to the space in a duct bank comprising the conduits. It is to be appreciated that in some instances these measurements may vary. The total weight of impact tool 10 may be approximately from about 15 pounds to about 25 pounds, with each end plate 30, 40 weighing from about 5 pounds to about 7 pounds. The overall measurement of strut 20 may be approximately three feet long and about four to six inches thick.

Figure 3:
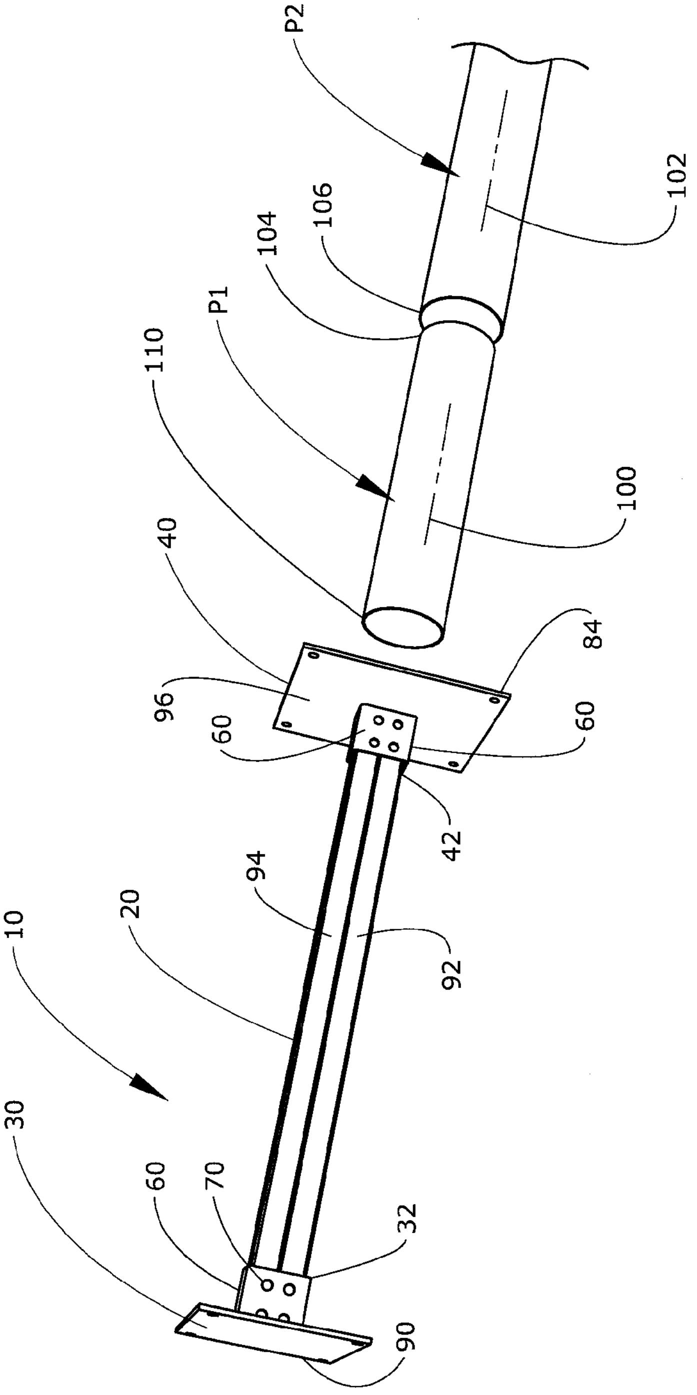
FIG. 3 is a perspective view illustrating the use of the impact tool of FIG. 1.

Referring to FIG. 3, it can be understood that in use of impact tool 10, pipe P1 and P2 are aligned so that longitudinal axis 100 of pipe P1 is aligned with longitudinal axis 102 of pipe P2. In general, P1 and P2 are supported by the earth in a trench. End 104 of pipe P1 is inserted into end 106 of pipe P2, such that end 104 of pipe P1 is accommodated inside pipe P2. Impact tool 10 is manually positioned by a workman with end plate 40, which is the impact-delivering end abutting a free end 110 of pipe P1, and impact tool 10 is struck against the free end 110 of pipe P1 by the workman. This operation may be done by only one workman since impact tool 10 is heavy enough and powerful enough to exert a sufficient force to couple the aligned pipes together without the additional workmen which generally are needed to hold the pipe ends together. Impact tool 10 transmits a force to the free end 110 of first pipe P1 thus driving its end 104 into end 106 of second pipe P2 thereby coupling pipe P1 and pipe P2 together. It is to be appreciated that a workman may manually apply impact tool 10 against the proximal pipe for this coupling of aligned pipes, and that the use of a sledge hammer or auxiliary device against impact tool 10 may be eliminated in that impact tool 10 is heavy and strong enough to exert a sufficient force against the pipes for their connection.

While the present invention has been described in connection with the preferred embodiments of the various figures, it is to be understood that other similar embodiments may be used or modifications and additions may be made to the described embodiment for performing the same function of the present invention without deviating there from. Accordingly, it is intended by the appended claims to cover all such changes and modifications as come within the spirit and scope of the invention.

What is claimed is:

1. An impact tool for delivering a force to a first pipe to connect the first pipe to a second pipe to form a system of aligned pipes, comprising:

a strut being substantially rectangular in cross-section and having a first end and a second end, an impact-absorbing plate mounted on the first end of the strut, an impact-delivering plate mounted on the second end of the strut, a first shoe attached to the impact-absorbing plate and having an aperture which is substantially rectangular in cross-section and which receives and supports the first end of the strut to connect the impact-absorbing plate to the first shoe, and a second shoe attached to the impact-delivering plate and having an aperture which is substantially rectangular in cross-section and which supports the second end of the strut to connect the impact-delivering plate to the second shoe, the impact tool being positioned to have the impact-delivering plate located adjacent to the end of first pipe and the impact-absorbing plate spaced away from the end of the first pipe so that an impact applied to the impact-absorbing plate is transferred through the strut to the impact-delivering plate and to the first pipe to force the first pipe and a second pipe together; and wherein the strut comprises two co-extensive elongated members extending between the impact-absorbing plate and the impact-delivering plate.

2. The impact tool of claim 1 further comprising a rubber cover on the impact-absorbing plate.

3. The impact tool of claim 1 further comprising a rubber cover on the impact-delivering plate.

4. The impact tool of claim 1 further comprising a plurality of bolts securing the strut to the first shoe and the second shoe.

5. The impact tool of claim 1 wherein the first shoe is welded to the impact-absorbing plate and the second shoe is welded to the impact-delivering plate.

6. An impact tool for delivering a force to a first pipe to connect the first pipe to a second pipe to form a system of aligned pipes, comprising:

a strut being substantially rectangular in cross-section and having a first end and a second end, an impact-absorbing plate mounted on the first end of the strut, an impact-delivering plate mounted on the second end of the strut, a first shoe attached to the impact-absorbing plate and having an aperture which is substantially rectangular in cross-section and which receives and supports the first end of the strut to connect the impact-absorbing plate to the first shoe, and a second shoe attached to the impact-delivering plate and having an aperture which is substantially rectangular in cross-section and which supports the second end of the strut to connect the impact-delivering plate to the second shoe, the impact tool being positioned to have the impact-delivering plate located adjacent to the end of first pipe and the impact-absorbing plate spaced away from the end of the first pipe so that an impact applied to the impact-absorbing plate is transferred through the strut to the impact-delivering plate and to the first pipe to force the first pipe and a second pipe together; and a plurality of bolts securing the strut to the first shoe and the second shoe.

* * * * *